W. F. TRAUDT.
PROCESS FOR MIXING VISCOUS MATERIALS.
APPLICATION FILED OCT. 31, 1919.

1,355,190.

Patented Oct. 12, 1920.
2 SHEETS—SHEET 1.

Inventor
William F. Traudt
By
Attorney

W. F. TRAUDT.
PROCESS FOR MIXING VISCOUS MATERIALS.
APPLICATION FILED OCT. 31, 1919.
1,355,190.
Patented Oct. 12, 1920.
2 SHEETS—SHEET 2.
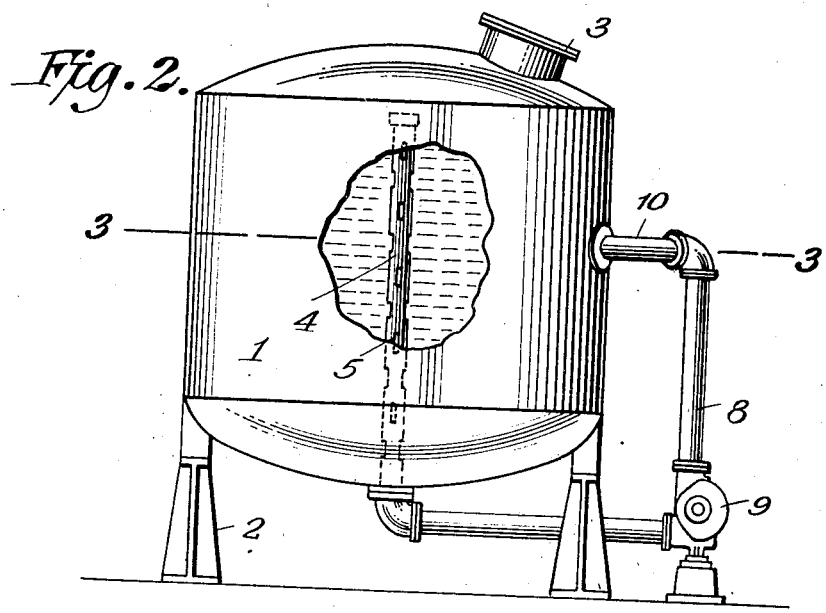
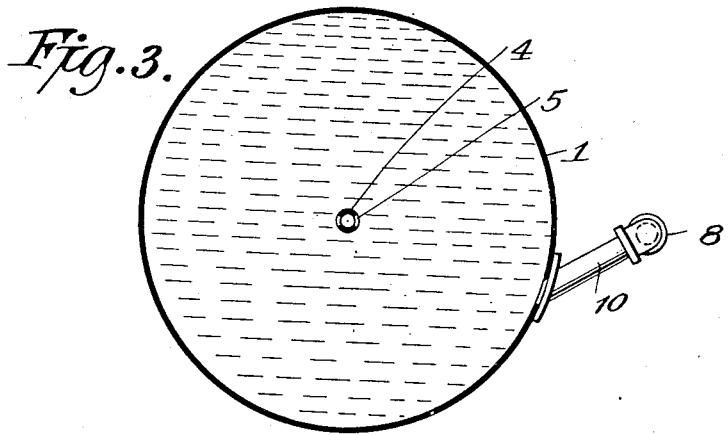

UNITED STATES PATENT OFFICE.

WILLIAM FREDERICK TRAUDT, OF BUFFALO, NEW YORK, ASSIGNOR TO TABER PUMP COMPANY, A CORPORATION OF NEW YORK.

PROCESS FOR MIXING VISCOUS MATERIALS.

1,355,190.   Specification of Letters Patent.   Patented Oct. 12, 1920.

Application filed October 31, 1919. Serial No. 334,896.

*To all whom it may concern:*

Be it known that I, WILLIAM F. TRAUDT, a citizen of the United States of America, residing at Buffalo, county of Erie, State of New York, have invented certain new and useful Improvements in Processes for Mixing Viscous Materials, of which the following is a specification.

My invention relates to the mixing of viscous materials which occur in more or less clearly defined strata of different colors, specific gravities, etc., as is frequently the case in the manufacture of condensed milk. In the ordinary condensed milk factory different batches of milk of differing compositions, colors, and other characteristics are separately concentrated and then collected together in large tanks, each of which may hold as much as 5000 gallons. On account of the viscosity of the material and the differing specific gravities of the numerous superposed strata it is extremely difficult to evenly distribute these into one homogeneous mass. No ordinary stirring or mixing device will do it. I have invented a process which may be carried out in various slightly differing forms of apparatus, and also certain apparatus for carrying out the process which will quickly and cheaply transform any such viscous, stratified mass into a homogeneous body of uniform color and composition, without injuring or modifying the constituent elements. The best form of apparatus at present known to me for carrying out my invention, together with certain modifications thereof, is illustrated in the accompanying two sheets of drawings in which—

Fig. 2 is a similar view of a modification;

Fig. 3 is a horizontal section on line 3—3 of Fig. 2, and

Throughout the drawings like reference characters indicate like parts.

Figure 1:
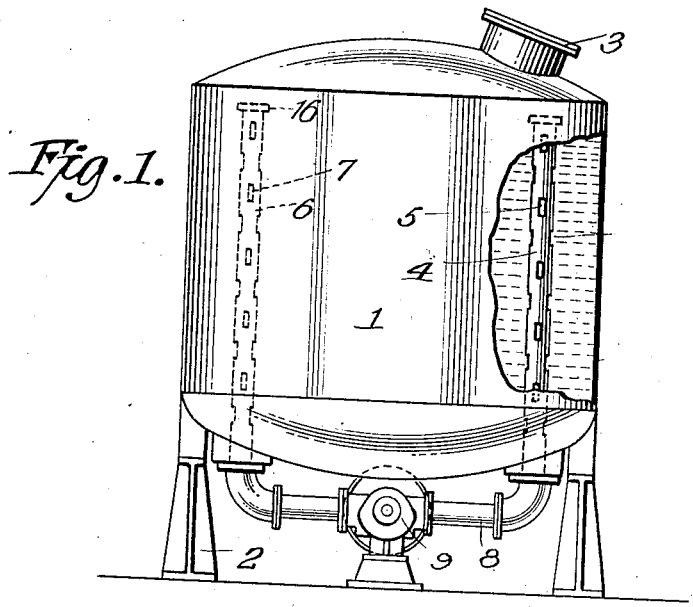
Figure 1 is a side elevation of the preferred form of apparatus, parts being broken away.

1, is a tank of considerable depth and capacity supported on legs 2, and provided with a manhole and cover 3. In the form shown in Fig. 1, a vertical standpipe 4, is set in, and passes through, the tank bottom near one wall or side thereof, and a second similar standpipe 6, is located near the other wall or side. Each standpipe has its upper end capped at 16, and has a series of openings 5, or 7, in its walls, spaced approximately evenly along its entire length. The lower, protruding ends of the standpipes 4, and 6, are connected by conduit 8, one to the inlet and the other to the outlet of a rotary or centrifugal pump 9.

In Figs. 2 and 3 but one such standpipe 4, is shown, and this is central in the tank. The conduit 8, leads from the inlet side of the pump to this standpipe in this construction and from the discharge side to a discharge nozzle 10, which passes through the tank wall in a direction substantially tangential thereto.

Figure 4:
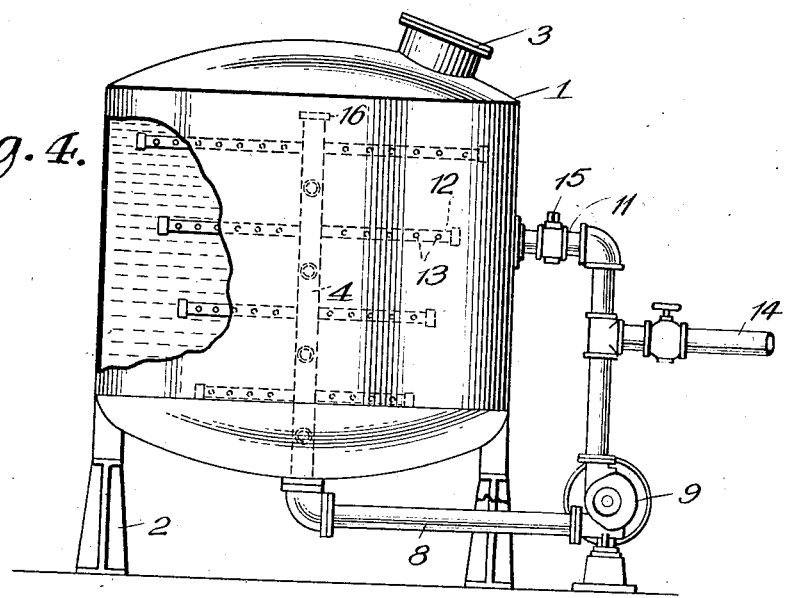
Fig. 4 shows another modification.

In the form shown in Fig. 4, the central standpipe 4, has a series of hollow, radial arms 12, 12, provided with equally spaced perforations 13, 13. The portion 11, of conduit 8, is provided with a shut-off valve 15, and with a branch discharge section 14, equipped with shut-off valve 17.

In operation the pump 9, is rotated continuously in either direction, or alternately in both directions, when tank 1, is filled with the stratified mass of condensed milk or other materials, or while it is being so filled. In the apparatus of Fig. 1, this operation draws some from each stratum of the mass out through the perforations in one pipe, as 4, at various levels, mixes these masses in the common mixing devices formed by conduit 8, and pump 9, and returns the commingled masses in a series of fine jets through the openings in the other standpipe at different levels to the various strata. As this process of combination, subdivision and recombination is carried on repeatedly, it soon effectively distributes the various particles of the different strata and produces one homogeneous mass. From time to time the direction of rotation of pump 9, may be reversed.

In the apparatus of Figs. 2, and 3, this action is facilitated by the whirling action set up by the tangential jet from nozzle 10. In Fig. 4, reliance is had on the widely distributed orifices 13, for this combining and dividing action, and the return pipe 11, discharges radially into the tank. In Figs. 2 and 4, also, the pump may, of course, be run in either direction.

If desired the tank may be filled, or emptied, or both, through a branch pipe 14, this pipe and conduit 11, being controlled by hand-operated valves 15, and 17, and by operating the pump the tank may be filled or discharged through branch 14.

In all the forms of apparatus shown, the underlying principle of operation is the contemporaneous drawing off of small portions from each stratum of the mass, mixing them together in a common mixture device, and returning the mixture so formed to be again operated on by this mixing process.

Having described my invention, I claim:

1. The process of mixing viscous materials assembled in horizontal strata which comprises the following steps: first, collecting said materials in a receptacle of considerable depth, second, simultaneously drawing off the material from each stratum through a suction device located in said stratum and passing the same through a common mixing apparatus, and third, discharging the mixture into a common receptacle.

2. The process of mixing viscous materials of differing specific gravities which comprises the following steps: first, assembling the materials in a receptacle of considerable depth wherein they arrange themselves in substantially horizontal strata; second, drawing off portions of the material from each stratum contemporaneously and passing the same through a common pump; and third, delivering the mixed materials simultaneously through a series of discharge orifices of different heights to a common receptacle.

3. The process of mixing viscous materials assembled in a common container in various more or less clearly defined strata, which comprises simultaneously drawing off portions of the material from each stratum in the container, passing the same through a common mixing device, returning the mixture to the same container simultaneously through a number of discharge orifices located at different levels therein, and continuing the said cycle of operations until a homogeneous mixture is produced in said container.

WILLIAM FREDERICK TRAUDT.